United States Patent [19]

Kamiya

[11] 4,019,473
[45] Apr. 26, 1977

[54] STRATIFIED COMBUSTION TYPE ENGINE

[76] Inventor: Minoru Kamiya, 2-46-3, Minami Otsuka, Toshima, Tokyo, Japan

[22] Filed: Dec. 4, 1974

[21] Appl. No.: 529,512

[30] Foreign Application Priority Data

Dec. 5, 1973   Japan ............................ 48-135345
Dec. 5, 1973   Japan ............................ 48-135346

[52] U.S. Cl. .................... 123/32 ST; 123/32 SP; 123/169 P; 123/191 S
[51] Int. Cl.² .................................... F02B 19/10
[58] Field of Search ........ 123/169 P, 143 R, 143 B, 123/32 ST, 32 SA, 32 SP, 191 S, 191 SP

[56] References Cited
UNITED STATES PATENTS

| | | | |
|---|---|---|---|
| 1,246,966 | 11/1971 | McDaniel | 123/169 EC |
| 1,870,981 | 8/1932 | Auzin | 123/169 P |
| 2,058,487 | 10/1936 | Mock | 123/32 SA |
| 2,534,346 | 12/1950 | Fenney | 123/32 ST |
| 3,621,821 | 11/1971 | Jarnuszkiewicz | 123/32 ST |

FOREIGN PATENTS OR APPLICATIONS 881,886   7/1953   Germany .................... 123/32 SA

*Primary Examiner*—Charles J. Myhre
*Assistant Examiner*—Tony M. Argenbright
*Attorney, Agent, or Firm*—Connolly and Hutz

[57] ABSTRACT

The present invention relates to a stratified combustion type engine comprising an engine cylinder, a main combustion chamber located above the cylinder, an injection nozzle for injecting auxiliary fuel towards the combustion chamber, and an open pre-combustion chamber provided within the combustion chamber for locally holding and vaporizing the flow of auxiliary fuel from the injection nozzle. The pre-combustion chamber is internally equipped with a spark plug.

2 Claims, 20 Drawing Figures

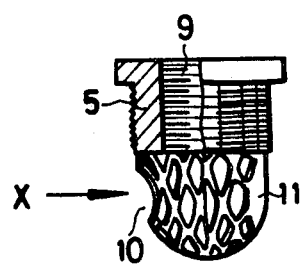
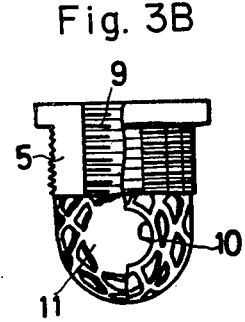
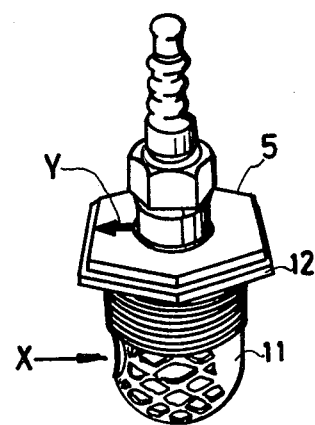

STRATIFIED COMBUSTION TYPE ENGINE

BACKGROUND OF THE INVENTION

The present invention relates to an internal combustion engine that operates on a stratified fuel charge.

Air pollution from auto exhaust gas is a serious public nuisance. Just how to completely eliminate the harmful components of the exhaust gas is a perplexing problem, and while various solutions have been proposed, none have operated in an efficient and trouble-free manner.

The present invention aims at solving this problem by stratifying the burning state of the mixed gas in the engine cylinder.

It is well known that whereas the theoretical mix ratio, i.e., air-fuel (weight ratio) in a gasoline-burning engine should usually be around 14.7:1, the existing auto engines are on the average run at an extremely high mix ratio, that is, at a high output ratio of 10–12:1 under non-steady state of starting or acceleration and at a ratio of 13–16:1 under steady state of constant speed operation. It is equally well known that if the mixed gas is to be completely burned for removal of its harmful components, the gas must have at least 10–20% more air than at the theoretical mix ratio. However, at such low mix ratios the output of the engine is to low to meet practical standards of use.

Thus, the so-called stratified combustion method was proposed in which a rich mixed gas is locally concentrated around the spark plug by various means to thereby increase the ignitability and the burning rate. A lean mixed gas with ample excess of air is supplied to the other parts of the cylinder so that complete combustion takes place with the burning flame of the rich mixed gas. This method has so far failed to find wide application because of difficulties in adjusting the two systems of rich and lean mixed gases.

Lately, to overcome these difficulties a Soviet torch type engine was proposed in which a carburetor for generating the two systems of rich and lean mixed gases and two suction valves within a single cylinder are provided. One of the valves opens into the pre-combustion chamber for filling the chamber with a rich mixed gas for complete combustion but the overall system is fatally defective in that its mechanism is complicated and the ventilation of the pre-combustion chamber is insufficient.

SUMMARY OF THE INVENTION

The present invention relates to a stratified combustion type engine.

The main object of the present invention is to provide an engine characterized by provision of an open pre-combustion chamber within the main combustion chamber located above the engine cylinder whereby a rich mixed gas zone is momentarily formed and maintained in the pre-combustion chamber. The primary burning gas which has been ignited is reburned in this open pre-combustion chamber which has been heated to a high temperature, and the gas thus reburned is injected to burn a lean mixed gas supplied to the cylinder. The burning effect of this engine with higher thermal efficiency secured through a reduced surface area of the combustion chamber is better than under ignition of the auxiliary combustion chamber above the cylinder in the conventional torch-type engine.

Another object of the present invention is to provide an engine with a better burning effect of the mixed gas assured by heating an open pre-combustion chamber which is projectingly installed in the space of the main combustion chamber located above the engine cylinder.

BRIEF DESCRIPTION OF THE DRAWINGS

Novel features and advantages of the present invention in addition to those mentioned above will become apparent to those skilled in the art from a reading of the following detailed description in conjunction with the accompanying drawings wherein similar reference characters refer to similar parts and in which:

FIG. 3A is a side elevational view of a cage type pre-combustion chamber, according to the present invention, with portions broken away to show details;

FIG. 3B is a front elevational view of the chamber shown in FIG. 3A;

FIG. 4 is an oblique view illustrating a pre-combustion chamber equipped with a spark plug;

FIGS. 8A and 8B to FIGS. 11A and 11B illustrate still other embodiments of the present invention with the A figures bottom views and the B figures side views.

DETAILED DESCRIPTION OF THE INVENTION

Figure 1:
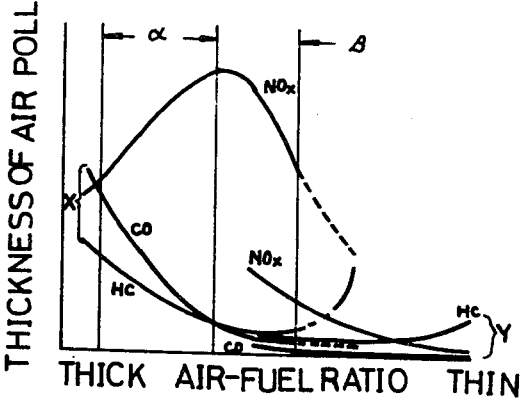
FIG. 1 is a diagram comparing the air pollutant emissions from a stratified combustion type engine of the present invention and from a conventional reciprocating engine.

FIG. 1 illustrates the degree of air pollutant emissions from engines in which CO (carbon monoxide), HC (hydrocarbons) and NOx (nitrogen oxides) constitute the pollutants versus the air-fuel ratio. As explained below, even at an air-fuel ratio in the misfiring range of conventional reciprocating engines, the stratified combustion type engine of the present invention operates normally and each curve clearly shows that the pollutant emission from the present engine is far lower than from conventional reciprocating engines. In FIG. 1, $\alpha$ indicates the workable range of a conventional engine while $\beta$ represents the misfiring range of a conventional engine. Reference character X is representative of the exhaust concentration from a conventional engine and Y is representative of the exhaust concentration from the stratified combustion type engine of the present invention.

Figure 2:
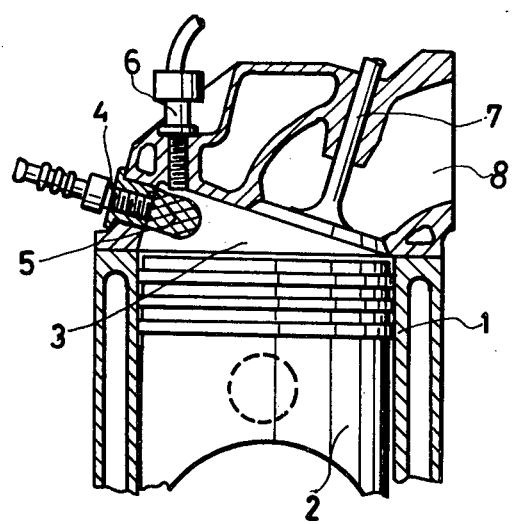
FIG. 2 is a partial longitudinal sectional view of an engine, according to the present invention.

FIG. 2 illustrates a common reciprocating engine with a piston 2 and a main combustion chamber 3 provided within a cylinder 1. According to the present invention, an open mixed gas holding chamber with a cage type grate, i.e., a precombustion chamber 5, is installed surrounding the tip of a spark plug 4 located within the main combustion chamber 3. Auxiliary fuel is injected through a nozzle 6 into the precombustion chamber at ignition time thereby creating locally a high-output mixed gas zone therein. The mixed gas zone is ignited by the spark plug 4 and a strong burning wave is ejected outward through the holes of the grate thereby causing complete combustion of lean mixed gas supplied to the main combustion chamber 3. As is well known, the expansion of gas thereby pushes the piston 2 in a downward direction.

In FIG. 2, 7 is the suction valve and 8 is the duct which introduces the lean mixed gas. Since the pre-combustion chamber 5 with a cage type grate is maintained in an extremely hot state except at engine start, the injected fuel is instantaneously vaporized and ignited, the combustion being thereby promoted by the spark plug 4. The burning gas in the precombustion chamber 5 while passing through the holes of an overheated grate has its unburned portion reburned and upon becoming still hotter and more pressurized, vastly enhances the burning effect.

The grate is desirably fabricated of nickel or tungsten steel with high resistance to high temperatures and high pressures. In FIGS. 3A and 3B illustrating the details of the cage grate type combustion chamber, 5 is the main assembly, 9 is the spark plug mounting, X is the fuel injecting direction, 10 is the injection opening and 11 is the reflecting plane opposed to the injection opening 10 against which the fuel particles collide and disperse at low temperatures.

FIG. 4 illustrates the combustion chamber 5 assembled with the spark plug 4. The arrow Y at the lock is a mark for matching the injection opening 10 with the injecting direction X. Preferably, the lock is provided with a double nut 12.

Figure 5A:
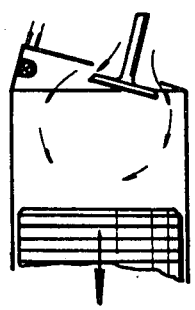
FIGS. 5A–5D illustrate the strokes of an engine, according to the present invention.
Figure 5B:
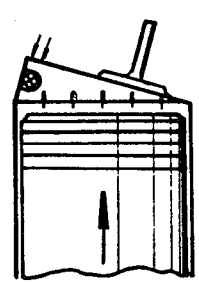
Figure 5C:
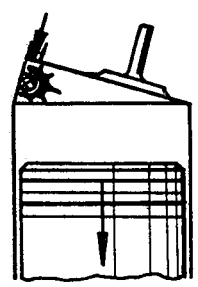
Figure 5D:
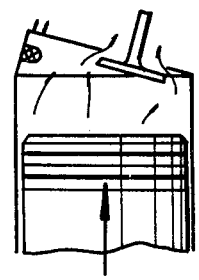

FIGS. 5A–5D explain the strokes of the invented engine. FIG. A represents the suction stroke in which a mixed gas which is lean on the average (the air-fuel ratio being 15–17:1 under non-steady state of starting or acceleration and 18–20:1 under steady state of constant speed operation) is sucked into the cylinder through the suction valve as the piston descends. FIG. 5B represents the compression stroke in which the mixed gas is compressed as the piston rises. At the time of ignition before the upper dead point, the auxiliary fuel is injected into the cage grate pre-combustion chamber and at the same time the spark plug ignites the gas. As a result, the combustion stroke begins, as shown in FIG. 5C. In this stroke a hot pressurized burning wave produced in the pre-combustion chamber causes the lean mixed gas in the main combustion chamber to burn up. The gas produced by this complete combustion is in the exhaustion stroke, shown in FIG. 5D, discharged through the exhaust valve as the piston rises. This completes one cycle of the engine.

Figure 6:
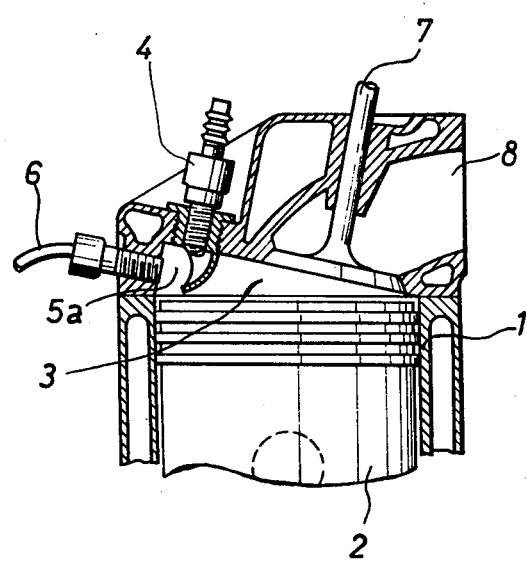
FIG. 6 is a view similar to FIG. 2 illustrating another embodiment of the present invention.
Figure 7A:
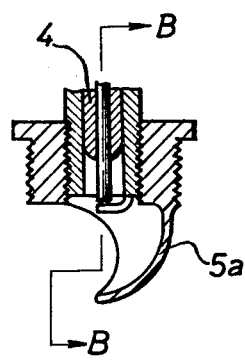
FIG. 7A is a longitudinal sectional view of the open pre-combustion chamber used in the embodiment of the invention illustrated in FIG. 6.
Figure 7B:
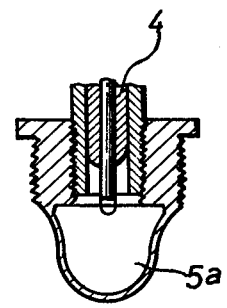
FIG. 7B is a sectional view taken along line B—B of FIG. 7A.

The other embodiments of the invention illustrated in FIGS. 6 and 7 are described below, and the like reference numerals have been used to identify similar parts.

An open spoon-like pre-combustion chamber 5a is installed close to the tip of the spark plug 4 in the main combustion chamber 3. A high-output mixed gas zone is locally created by injecting the auxiliary fuel through the nozzle 6 in the X direction towards the pre-combustion chamber. The mixed gas zone is ignited by the spark plug 4 and a strong burning wave is sent to the lead mixed gas layer of marginal inflammability which is supplied to the main combustion chamber 3. The lean mixed gas is thus completely burned and the expansion of the gas pushes the piston 2 in a downward direction.

Figure 8A:
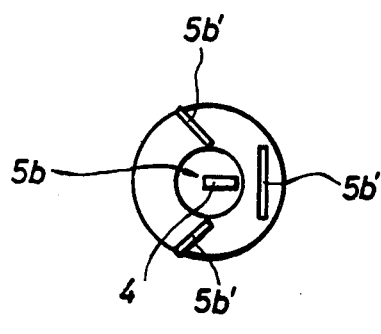
Figure 8B:
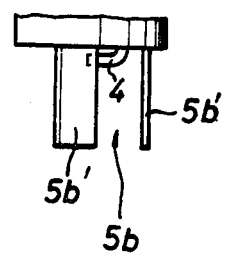

Still another embodiment of the present invention is illustrated in FIGS. 8A and 8B. In this embodiment the open pre-combustion chamber comprises three vertical plates $5b'$, and one of them is fitted as to intersect the injecting direction of the nozzle 6. The other two plates are staggered at an angle from the former one, and a spark plug is located nearly at midpoint between them.

Figure 9A:
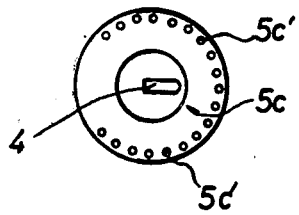
Figure 9B:
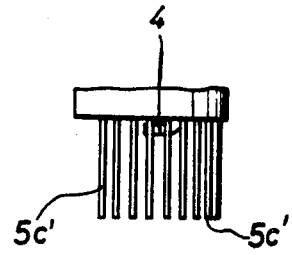

In the embodiment of the invention illustrated in FIGS. 9A and 9B, the open pre-combustion chamber comprises a plurality of vertical rods $5c'$ located around the spark plug 4.

Figure 10A:
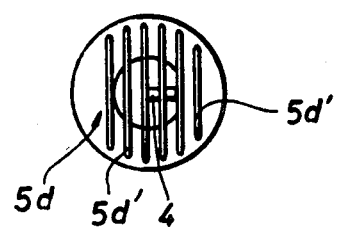
Figure 10B:
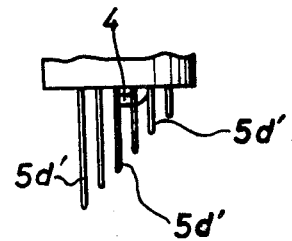

In the embodiment illustrated in FIGS. 10A and 10B, the open pre-combustion chamber comprises a plurality of U-shaped rods $5d'$ arranged in parallel around the spark plug 4.

Figure 11A:
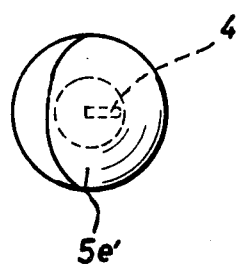
Figure 11B:
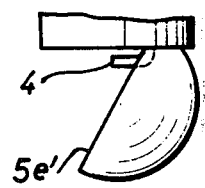

In the embodiment illustrated in FIGS. 11A and 11B, the open pre-combustion chamber comprises a ball-like body $5e'$ partially surrounding the spark plug 4, as shown.

Since all the open pre-combustion chambers illustrated in FIGS. 6–11 are maintained at high temperature, the auxiliary fuel is instantaneously vaporized and ignited thereby causing complete combustion of the lean mixed gas around it and thus the harmful contents of the exhaust gas are minimized.

As described above, according to the present invention, the harmful contents, notably the CO content of the exhaust gas are completely burned through stratified combustion in the cylinder. The CO content of the effluent is extremely low, and as shown in FIG. 1, it is less than 1/10 of the content of the exhaust gas from a conventional engine.

In the present invention, control of the lean mixed gas supply by the carburetor is done entirely in the same way as with conventional reciprocating engine systems. Meanwhile, each injected amount of the auxiliary fuel supplied to the precombustion chamber, which serves merely as a primer, can be practically constant and accordingly the control of operation of the invented engine is extremely easy and simple and not materially different from that of a conventional engine. Moreover, it should be noted that the present invention is applicable not only to gasoline engines but also to diesel engines.

What is claimed is:

1. A stratified combustion type engine comprising an engine cylinder, a main combustion chamber located above the cylinder, a spark plug within the main combustion chamber, an injection nozzle directed towards the main combustion chamber for injecting auxiliary fuel, and a cage having peripheral openings therein and a larger opening which is aligned with the injection nozzle, the cage surrounding the spark plug tip and projectingly installed within the main combustion chamber in the path of auxiliary fuel flow from the injection nozzle for holding and vaporizing the flow of fuel from the nozzle.

2. A stratified combustion type engine as in claim 1 wherein the cage has a reflecting plane opposite to the opening.

* * * * *